Nov. 16, 1965    J. B. WILHELMI    3,217,439
INDICATOR AND BUSHING ASSEMBLY
Filed Dec. 5, 1962
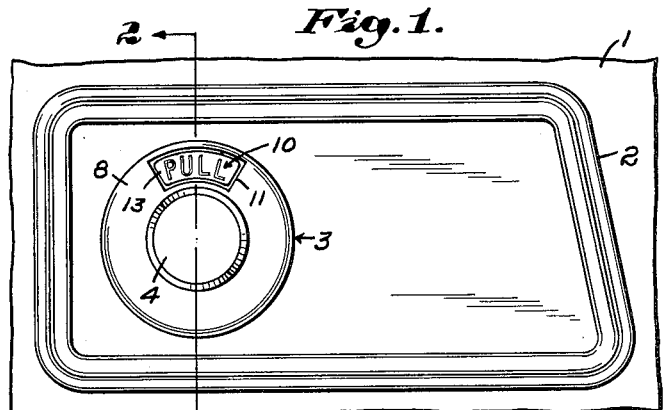
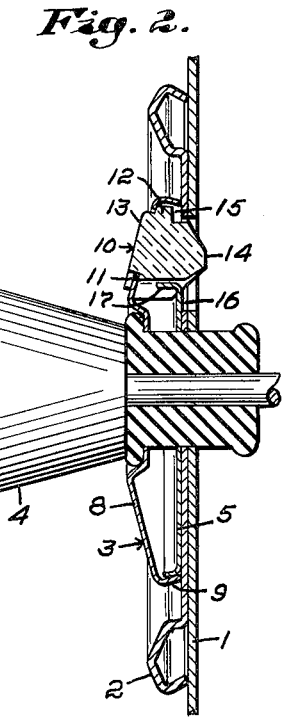
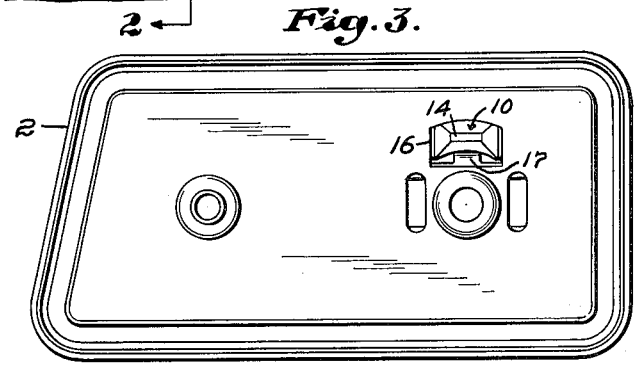
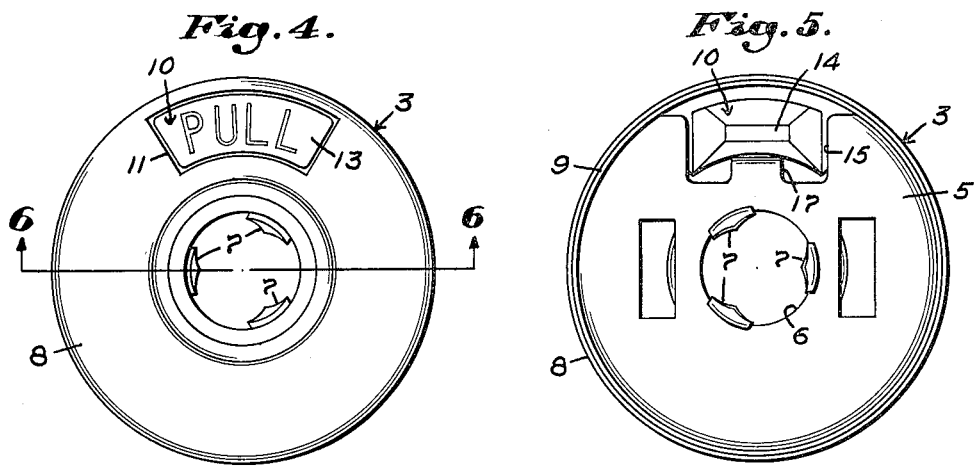
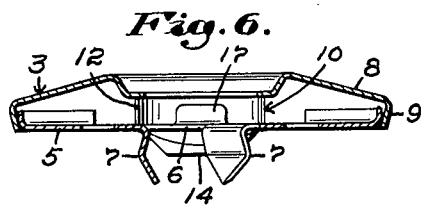
Inventor:
Julius B. Wilhelmi,
by Walter P. Jones
Atty.

United States Patent Office 3,217,439
Patented Nov. 16, 1965

3,217,439
INDICATOR AND BUSHING ASSEMBLY
Julius B. Wilhelmi, Nantasket, Hull, Mass., assignor to United-Carr Incorporated, a corporation of Delaware
Filed Dec. 5, 1962, Ser. No. 242,494
1 Claim. (Cl. 40—331)

This invention relates to an indicator and bushing assembly for use in motor vehicle bodies and the like wherein the assembly includes a panel, a mounting plate (if desired), a bushing assembly including an indicator lens, and a knob and shaft (or operating wire) in association with some device to be operated by the knob and shaft.

An object of the invention is to provide a simple, inexpensive assembly of parts that may be easily and quickly assembled wherein the main item of the assembly is a combination of parts making up an efficient bushing device.

In the drawings which illustrate one embodiment of the invention:

FIG. 1 is a front elevational view of a portion of a panel (such as a motor vehicle dash panel) showing the indicator bushing assembly;

FIG. 2 is an enlarged section taken on the line 2—2 of FIG. 1;

FIG. 3 is a rear view of the bushing and mounting plate assembly shown in FIG. 1, the dash panel being omitted;

FIG. 4 is a front elevation of the indicator bushing assembly per se;

FIG. 5 is a rear view of the device shown in FIG. 4; and

FIG. 6 is a section taken on the line 6—6 of FIG. 4.

Referring now to the particular assembly, illustrated by the drawings, there is shown (FIGS. 1 and 2) an assembly that may represent the dash panel of a motor vehicle to which is assembled an improved combination bushing and indicator device in conjunction with the mounting of an operating knob and shaft for connection to a brake mechanism, light switch, radio device, to be operated by the knob, or some other similar device.

In FIG. 1 there is shown a front view of the installation including a portion of a dash panel 1, sub-panel or mounting plate 2, snap attached assembly bushing 3, and operating knob 4.

The bushing assembly 3 (FIGS. 4, 5, and 6) includes a plug button member 5, having a central aperture 6 surrounded by yieldable fingers 7, a cap 8, having a peripheral wall 9 crimped over the outer edge of the plug button member 5 (FIG. 5) and an indicator lens member 10 exposed through an aperture 11 in the cap 8.

It is important to maintain the bushing assembly in predetermined position to the panel 1 and the lens member 10 in a desired position to the bushing assembly 3. Therefore, the lens member 10 has a body portion 12 provided with a raised boss portion 13 on its outer face fitting into aperture 11 in the cap 8. A second boss 14 extends from the back face of the body portion 12 and co-operates with an aperture 15 in the plug button member 5. This second boss 14 also co-operates with an aperture 16 in the sub-panel 2.

A yieldable projection 17 extends from the plug button 5 adjacent the aperture 15 and engages the indicator lens member 10 to keep the lens in tight assembly with the plug button member and cap to prevent noises that might arise from vibration of the device.

While a particular indicator and bushing assembly construction has been described above in combination with panel means and an operating shaft it should be understood that the drawings and description relate only to one particular construction of the invention; the invention being best defined by the following claim.

I claim:

An indicator and bushing assembly comprising, in combination, a mounting plate having an aperture therethrough, an apertured bushing assembly mounted on said plate through said aperture for the passage of a suitable shaft and an indicator lens as a part of the bushing assembly, said bushing assembly including a plug button member having yieldable prongs snapped through the aperture in the mounting plate, a cap assembled to the plug button member, said indicator lens held in place between said plug button member and said cap, and said cap having an aperture exposing said indicator lens, said indicator lens having a boss on the front fitting into the aperture in the cap, a second boss on the back fitting into an aperture in the plug button member, said bosses preventing relative rotation of the parts, said second boss also extending into said mounting plate to prevent rotation of the bushing assembly relative thereto and permit passage of light through the indicator lens and a vibration preventing yieldable portion pressing against said indicator lens.

References Cited by the Examiner
UNITED STATES PATENTS

| 2,042,416 | 5/1936 | Weindel | 40—20 |
| 2,289,228 | 7/1942 | Warner | 40—20 |
| 2,617,216 | 11/1952 | Kitgour | 40—331 |

EUGENE R. CAPOZIO, *Primary Examiner.*

JEROME SCHNALL, *Examiner.*